United States Patent
Grigory et al.

[11] Patent Number: 6,004,412
[45] Date of Patent: Dec. 21, 1999

[54] METHOD AND SYSTEM FOR REPAIRING A DAMAGED PLASTIC PIPE

[75] Inventors: Stephen Cecil Grigory, San Antonio; Glen William Deel, Crockett; Jesse Abergo Villarreal; Rolf Glauser, both of San Antonio, all of Tex.

[73] Assignee: Gas Research Institute, Chicago, Ill.

[21] Appl. No.: 08/898,725

[22] Filed: Jul. 22, 1997

[51] Int. Cl.$^6$ .......................... B29C 65/06; F16L 55/175
[52] U.S. Cl. .............................. 156/73.5; 156/94; 138/97; 138/98
[58] Field of Search .......................... 156/94, 73.5, 73.6, 156/153, 155, 294, 311, 499, 303.1, 580; 138/97, 98; 264/68

[56] References Cited

U.S. PATENT DOCUMENTS

| | | |
|---|---|---|
| 3,385,741 | 5/1968 | Allen . |
| 3,468,732 | 9/1969 | Hewitt . |
| 3,536,242 | 10/1970 | Gordon, Jr. et al. ................. 156/73 X |
| 3,562,073 | 2/1971 | Kibler . |
| 3,564,703 | 2/1971 | Kiwalle . |
| 3,576,067 | 4/1971 | Loyd et al. . |
| 3,580,762 | 5/1971 | Zumstein . |
| 3,594,297 | 7/1971 | Singleton . |
| 3,616,980 | 11/1971 | Padilla . |
| 3,690,088 | 9/1972 | Anderson et al. . |
| 4,427,471 | 1/1984 | Chierici . |
| 4,566,924 | 1/1986 | Hara et al. . |
| 4,660,865 | 4/1987 | Workman ........................... 156/73.5 X |
| 4,780,035 | 10/1988 | Shibayama et al. . |
| 4,787,956 | 11/1988 | Hoefer et al. ....................... 156/73.5 X |
| 5,203,082 | 4/1993 | Bontems ............................ 156/73.5 X |
| 5,505,811 | 4/1996 | Welch et al. ........................ 156/499 X |

*Primary Examiner*—Michael W. Ball
*Assistant Examiner*—Shawn A. Mitchell
*Attorney, Agent, or Firm*—Factor and Shaftal

[57] ABSTRACT

A sealing system for repairing an aperture or notch of a damaged plastic pipe. The sealing system comprises a patch member and an attachment tool. The patch member includes a top side, a bottom side, and comprises, in part, a thermoplastic material. The attachment tool includes a housing, a power source associated with the housing, a base member, attachment members for attaching the base member to the patch member, and members which facilitate positioning to the power source relative to the housing. The invention further includes a method of repairing an aperture or notch of a damaged plastic pipe.

2 Claims, 2 Drawing Sheets

METHOD AND SYSTEM FOR REPAIRING A DAMAGED PLASTIC PIPE

BACKGROUND OF THE INVENTION

1. Field of the Invention

The present invention is directed to pipe sealing systems, and, more specifically, to a seal system for repairing a damaged plastic pipe through spin friction and pressure, without substantially affecting the flow of the fluid through the plastic pipe.

2. Background Art

Pipelines have long been used for the transportation, movement, and disposal of fluids comprising both liquids and/or gasses. These pipes are often exposed to elements such as temperature extremes, precipitation, solar radiation etc. Pipes, such as plastic pipes, which are increasingly used in the transportation of natural gas, are quite susceptible to these elements. Additionally, at some point during the service life, it is likely that such pipes will develop leaks due to workers digging too close to the pipes, as well as due to the knocking away of fittings.

In addition to the leaks, Federal Regulations require repair or replacement of a damaged plastic pipe wherein the depth of a nick or gouge on the surface of the damaged plastic pipe exceeds ten percent of the thickness of that pipe.

Repair to the pipes is quite difficult and each method has inherent drawbacks. One manner of repair consists of stopping the flow of the fluid and replacing the damaged section of pipe. The major drawback of this procedure lies with both the need to disrupt service in the pipe, and the labor and time costs associated therewith. Not only will the customer be without service, but the replacement requires new pipes, fittings and many labor hours.

Certain sealing type devices have been introduced to repair leaks that do not require the replacement of sections of the pipe. Many of these sealing methods nevertheless require the stopping of fluid for some period of time. Other seals are only a temporary "band aid" which must later be replaced with more permanent solutions.

SUMMARY OF THE INVENTION

The invention comprises a sealing system for repairing an aperture or notch of a damaged plastic pipe. The sealing system comprises a patch member and an attachment tool. The patch member includes a top surface and a bottom surface. At least a portion of the patch member comprises a thermoplastic material which has a melting point similar to the plastic pipe. The attachment tool comprises a housing, a power source releasably associated with the housing and a base member rotatably associated with the power source. Further, the attachment tool includes means for releasably securing the top side of the patch member to the base member, and, means for positioning the power source between the distal end and the proximal end of the housing.

In a preferred embodiment, the patch member includes at least one surface aberration. In such an embodiment, the base member releasable securing means comprises a mating surface aberration corresponding to the patch member surface aberration.

In another preferred embodiment, the patch member is generally circular and includes an internal cavity. Preferably, the patch member material comprises one of polyethylene plastic, ABS plastic and polyethylene repair material.

In a preferred embodiment, the power source comprises an electric motor. Additionally the positioning means comprises an adjustment member rotatably associated with the housing and attached to the power source. Rotation of the adjustment member repositions the power source.

In another preferred embodiment, the sealing system further includes means for clamping the attachment tool to the damaged plastic pipe. In such an embodiment, the clamping means may further include two strap members extending around at least a portion of the damaged plastic pipe.

The invention further includes a method for repairing an aperture or notch in a damaged plastic pipe. The method includes the steps of: (a) locating the aperture in a damaged plastic pipe; (b) selecting an appropriately sized patch member wherein the patch member includes a top side and a bottom side; (c) releasably securing the top side of the patch member to a base member of an attachment tool; (d) positioning the attachment tool proximate the aperture of the damaged plastic pipe; (e) rotating the base member, and, in turn, the patch member; (f) forcing the bottom side of the patch member toward and into contact with the damaged plastic pipe; (g) melting at least a portion of the patch member and the damaged plastic pipe through heat generated by the contact between the patch member and the damaged plastic pipe; (h) precluding the rotation of the rotatable member after a desired amount of time; (i) fusing the patch member to the damaged plastic pipe; and j) releasing the patch member from the attachment tool.

In a preferred embodiment, the process may further include the step of releasably clamping the attachment tool to the damaged plastic pipe.

DETAILED DESCRIPTION OF THE DRAWINGS

Figure 1:
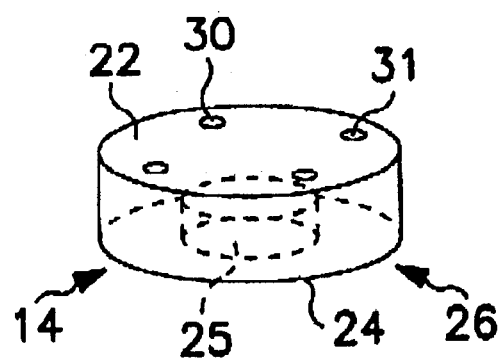
FIG. 1 of the drawings is a perspective view of the patch member of the present invention.

While this invention is susceptible of embodiment in many different forms, there is shown in the drawings and will herein be described in detail, a specific embodiment with the understanding that the present disclosure can be considered as an exemplification of the principles of the invention and is not intended to limit the invention to the embodiment illustrated.

Figure 2:
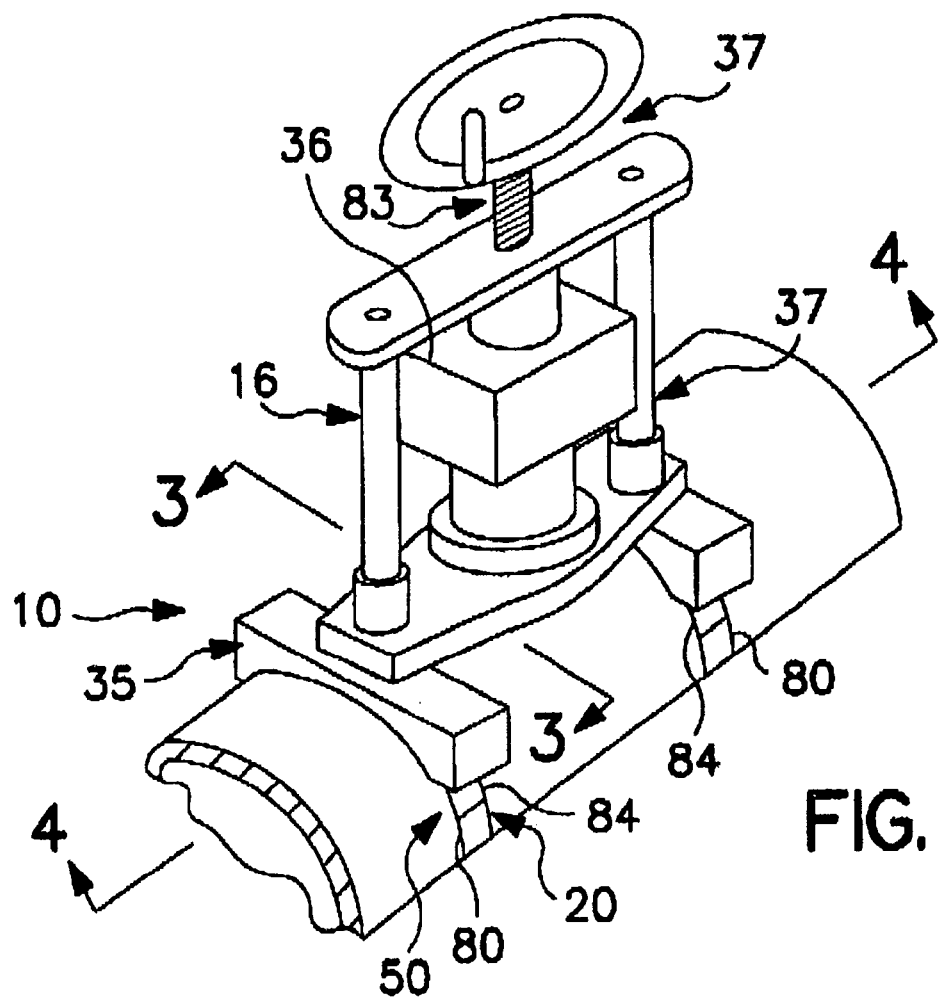
FIG. 2 of the drawings is a perspective view of the attachment tool of the present invention.
Figure 3:
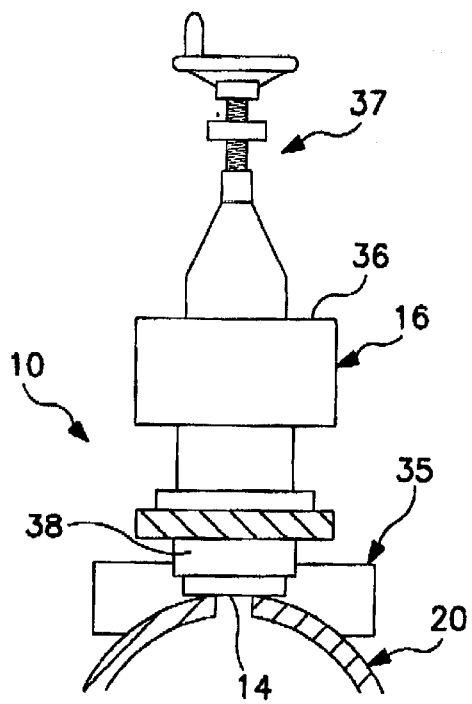
FIG. 3 of the drawings is a cross-sectional view of the attachment tool of the present invention taken generally along lines 3—3 of FIG. 2.
Figure 4:
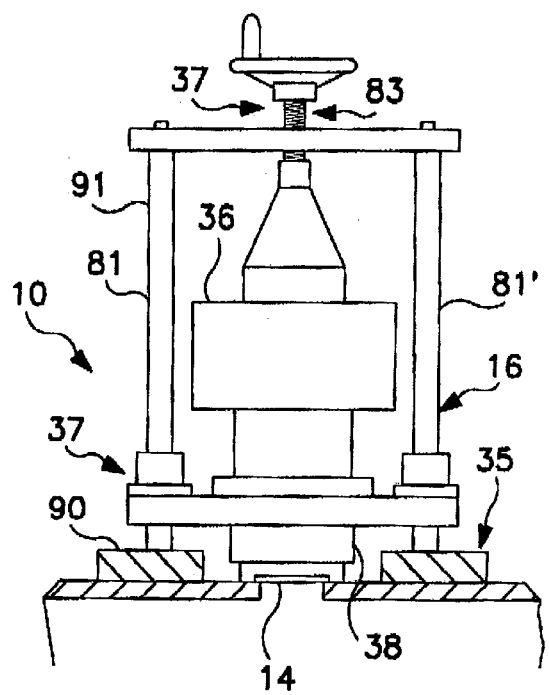
FIG. 4 of the drawings is a cross-sectional view of the attachment tool taken generally along lines 4—4 of FIG. 2.

Sealing system 10 is shown in FIGS. 2, 3 and 4 as comprising patch member 14 and attachment tool 16 for attaching the patch member to the damaged plastic pipe. Patch member 14 is seen in FIGS. 1, 5, 6 and 7 as comprising top surface 22, bottom surface 24, outer rim 26, internal cavity 25, and patch member attachment means 30. Outer rim 26 of patch member 14 is of a uniform thickness wherein top surface 22, and bottom surface 24 are generally circular. As will be explained, internal cavity 25 extends from bottom surface 24 at least partially toward top surface 25. This serves to reduce the size and weight of the patch member, and, as will be explained, facilitates use of the present sealing system in conjunction with other seals. Of course, other configurations of the patch member and the internal cavity including other shapes and thicknesses, are likewise contemplated.

Attachment means 30 is shown in FIGS. 1, 5, 6 and 7 as comprising surface aberration 31, which, as will be explained, matingly attaches to aberrations on attachment tool 16. Of course, a multitude of other structures for releasably retaining patch member 14 to attachment tool 16, such as through utilization of, for instance, hook and loop fasteners, snaps, screws, electromagnets, among others, which may attach to the top or sides of the patch member, are likewise contemplated.

Patch member 14 may comprise various plastics having a thermal melting point comparable to the damaged plastic pipe that is to be sealed or repaired. For instance, in the case of polyethylene pipes, patch member 14 may comprise PERM (Polyethylene repair material). Of course, many other materials, including other plastics, such as other polyethylene plastics and ABS plastics, among others.

Figure 7:
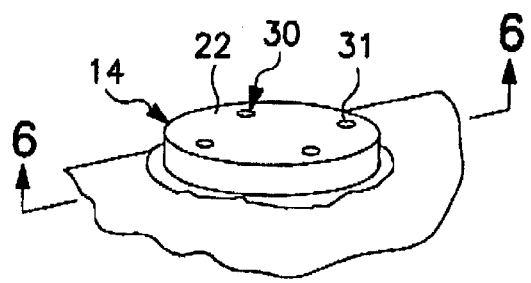
FIG. 7 of the drawings is a perspective view of the patch member after fusion with the damaged plastic pipe.

Patch member attaching tool 16 is shown in FIGS. 2, 3 and 7 as comprising housing 35, power source 36, means 37 for positioning the power source relative to the housing, base member 38 (FIG. 5) and clamping means 20. Housing 35 includes guides 81, 81' which extend from proximal end 90 to distal end 91. Power source 36 compromises an pneumatic motor of sufficient predetermined torque and speed output such that it is capable of rotating its drive at a desired speed with a desired power. Likewise, power source 36 may comprise, among other things, a electrically driven device which is likewise capable of the desired output.

Positioning means 37 as shown in FIG. 4 comprises adjustment member 83. The rotation of adjustment member 83 relative to guides 81, 81' of housing 35 slidably positions power source 36 between the distal end and the proximal end of the housing.

Figure 5:
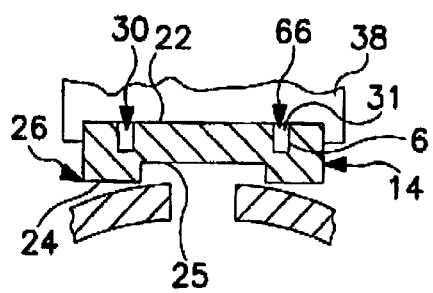
FIG. 5 of the drawings is a partial cross-sectional view of the patch member taken generally along lines 3—3 of FIG. 2 showing in particular the patch member as it contacts the damaged plastic pipe.

Base member 38 is shown in FIGS. 3 and 5 as being attached to the drive of power source 36 and including base member attachment means 66 (FIG. 5). Base member attachment means 66 is configured to matingly engage patch member attachment means 30. Specifically, patch member attachment means comprises surface aberration 61 which matingly engages surface aberration 31 of patch member 14.

Means 20 for clamping tool 16 to the damaged plastic pipe, as shown in FIG. 2 and 3, comprises adjustable retaining members, such as adjustable retaining member 50 (FIG. 2). Each retaining member comprises strap member 80 (FIG 2) and retaining/adjusting clamp 84 (FIG. 2). Strap member 80 should be of sufficient length to extend around the circumference of the damaged plastic pipe and retaining/adjusting clamp 84 is capable of both attaching the strap member to the housing and adjusting the strap member to the proper length. Of course, it is also contemplated that clamping means 20 may comprise any number of vise-like clamps screw/grip clamps, industrial hook and loop fasteners, among others. All of such clamping means are of sufficient strength to maintain tool 16 in the proper desired position, relative to the damaged plastic pipe throughout the entire procedure. It is also contemplated that clamping means may extend only partially around the entire circumference of the damaged plastic pipe. This is useful where the pipes are underground and the ground in the area is difficult to move.

In operation, the aperture (or the notch) in damaged plastic pipe 12 that is to be repaired is located and isolated. In a situation where the pipe is buried, the ground around the aperture is first cleared away to expose the pipe. Next, a suitably sized patch member is selected from the multitude of available shapes and sizes. Of course, the selected patch member must be sized so as to cover the entirety of the aperture or notch, otherwise, an integral seal and/or repair will not be made.

Once the desired patch member is selected, as shown in FIG. 3 and 4, patch member 14 is attached to the base member 38. Specifically, surface aberration 61 matingly engages surface aberration 31 on base member 38. In the embodiment shown, these aberrations essentially loosely "snap" together.

With patch member 14 attached to tool 16, the tool is next properly positioned and releasably attached proximate the aberration or notch of the damaged plastic pipe 12. Next, strap member 80 is extended from one end of the tool housing, around the circumference of damaged plastic pipe 12, and attached via retaining/adjustable clamps 84 back onto the tool housing. The clamps are adjusted until the straps securely retain tool 16 in the proper orientation.

Once fully secured, power source 36 is activated to rotate base member 38 and, in turn, patch member 14. As base member 38 and patch member 14 reach operating speed, positioning member advances power source 36, and, patch member 14 toward proximal end 90 of the housing member 35 and into eventual contact with the damaged plastic pipe. Specifically, the rotation of adjustment member 83 relative to the housing advances power source along guides 81, 81' of housing 35.

Once the rotating patch member 14 contacts damaged plastic pipe 12, pressure is maintained on the patch by adjustment member to maintain contact, so that the frictional interference of the two surfaces results in the generation of heat. The generated heat is of a magnitude sufficient to melt at least a portion of the rotating patch member, and, at least a portion of the surface of the damaged plastic pipe proximate the aperture (or notch).

Figure 6:
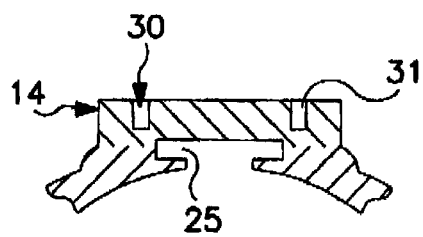
FIG. 6 of the drawings is a partial cross-sectional view taken generally along lines 6—6 of FIG. 7 showing, in particular, the patch member after fusion with the damaged plastic pipe.

As these regions continue to melt due to the heat, the clamping member maintains the desired pressure forcing the patch member into the pipe to promote further melting of the surfaces. After a short period of time, portions of patch member 14 have melted to such an extent that, as shown in FIGS. 6 and 7, a bead of the melted patch member is continuous about the outer perimeter of the patch member. Power source 36 is then turned off, and the rotation of base member 38, and, patch member 14 stops.

Even when stopped, the pressure is maintained by the adjustment member to keep the patch member and the pipe in contact. As patch member 14 cools, melted portions of patch member 14 interlock and begin to fuse to melted portions of pipe member 12. Within minutes, the melted region of plastic pipe 12 and patch member 14 cool into fused engagement. The patch member is thus permanently joined to damaged plastic pipe 12 sealing the aperture (or reinforcing the notch).

Once patch member 14 is fully fused and the connection has cooled, tool 16 may be removed from engagement with damaged plastic pipe 12. As this is done, patch member 14 will disconnect from distal end of rotatable member, inasmuch as the fusion bond between the pipe and the patch member is stronger than the patch attachment means.

Where the fluid exits through the aperture at an elevated pressure, such as in excess of 40 psig, while not required, it is useful to first apply a plug seal or an internal seal before using the system. Inasmuch as it is more difficult to obtain a permanent fusion bond at such elevated high pressures, such a "first" seal can be helpful. Indeed, internal cavity 25 of patch member 14 is provided to accommodate the use of the "first" seal structures in high pressure applications.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. A method for repairing an aperture or notch in a damaged plastic pipe, the method comprising the steps of:
   (a) locating the aperture or notch in a damaged plastic pipe;
   (b) selecting an appropriately sized patch member wherein the patch member includes a top side and a bottom side;
   (c) releasably securing the top side of the patch member to a base member of an attachment tool;
   (d) positioning the attachment tool proximate the aperture or notch of the damaged plastic pipe;
   (e) rotating the base member, and, in turn, the patch member;
   (f) forcing the bottom side of the patch member toward and into contact with the damaged plastic pipe;
   (g) melting at least a portion of the patch member and the damaged plastic pipe through heat generated by the contact between the rotating patch member and the damaged plastic pipe;
   (h) precluding the rotation of the patch member after a desired amount of time, the patch member thereby sealing the aperture or notch and being fused to the pipe; and
   (i) releasing the patch member from the attachment tool.

2. The method according to claim 1 further including the step of releasably clamping the attachment tool to the damaged plastic pipe.

* * * * *